Patented Jan. 13, 1942

2,270,124

UNITED STATES PATENT OFFICE 2,270,124

LUMINESCENT MATERIAL

Magdalene Hüniger, Berlin-Charlottenburg, and Hans Panke, Berlin, Germany, assignors to General Electric Company, a corporation of New York No Drawing. Application February 27, 1939, Serial No. 258,858. In Germany March 2, 1938

3 Claims. (Cl. 250—81)

Our invention relates in general to luminescent materials such as are used in gaseous electric discharge devices for the production of fluorescent light. More particularly, our invention relates to activators for such luminescent materials, and to a method of preparing luminescent materials with such activators.

Luminous substances or phosphors which convert short wave radiations into relatively longwave radiations are preferably manufactured at present according to the method described by Lenard, in which only very slight quantities of activating materials are added to the base substances of which the luminescent substances are composed. Because of the relatively small quantities of the activators, it is necessary that the materials be of a certain degree of purity, and that the amount of activator added be accurately controlled.

One object of our invention is to provide luminescent substances which will produce good luminescence when excited by short-wave radiations and which contain a relatively large amount of activating material so that the requirement as to the purity of the materials and the accurate additions of the activators is not so exacting as heretofore.

Another object of our invention is to provide a method for producing such luminous substances containing a relatively large amount of activating material.

Further objects and advantages of our invention will appear from the following description of species thereof.

It has been found that good luminescence can be obtained by introducing into the structure of borates and phosphates very large quantities of activating metals. The basic materials in these borate and phosphate types of phosphors are preferably the borates and phosphates of the alkali metals, the metals of the second group of the periodic system except mercury, and the metals of the third group of the periodic system. All these are activated, according to the invention, by an addition of 0.05 to 30 mol per cent of the borates or phosphates of silver, thallium, tin or lead. The most favorable concentration is obtained when the addition amounts to 3-7 mol per cent. A few basic substances require a larger addition, and some a smaller addition, in order to bring about the brightest luminescence. However, the concentration range within which the luminescence occurs is exceedingly large, so that the phosphors are quite insensitive to deviations.

The fundamental substance has only a slight influence on the color of the luminescence, the color being determined nearly completely by the activator that has been added and being a characteristic of that activator. Silver borate or phosphate gives in borates or phosphates a yellowish white or bluish white luminescence. Thallium borate or phosphate produces a blue-violet luminescence, while tin borate or phosphate gives a blue-green, and lead borate or phosphate gives a blue luminescence.

The phosphors are produced by heating a mixture of the original materials which may be finely powdered or which may consist of coarse granules. For the original materials, one can use oxides, carbonates, oxalates, and similar salts, which are transformed into borates or phosphates by the addition of boric acid, phosphoric acid, ammonium phosphate or the like. One can also start with the finished borates or phosphates and may transform them into phosphors by mixing and heating. It is not necessary to fuse them together; a simple sintering will suffice. In many instances, however, it is advisable to melt the materials. After the melting, they can then be left to solidify into glassy or crystalline bodies. If the phosphors are to solidify in a glassy form, it is advisable to increase the addition of boric or phosphoric acid to such an extent that the oxide or acid content will exceed the acid content called for by the chemical formula of the metaborates or metaphosphates.

Experiments have proven the possibility of utilizing two or more basic substances simultaneously. It is especially possible to use simultaneously borates or phosphates of different metals, or borates and phosphates of the same metal, or to use a mixture of different metallic, as well as a mixture of different acid, constituents. Inasmuch as the luminescence depends but slightly on the basic material, no great change in the luminescence is brought about by that procedure.

Entirely different effects are obtained, however, when several activators are added to the basic material, which may consist of more than one material. An admixture of manganese borate or manganese phosphate as additional activators has proven to be especially effective. Here, the manganese combination, which does not have a particularly good activator effect, is absorbed by the basic substances, and displaces the luminescence of the main activator or activators toward longer wave lengths, and increases also, in a few cases, the intensity. It then becomes possible to produce red or orange phosphors. Of particular effect is the manganese combination in the case of lead phosphate or borate, and tin phosphate or borate. The phosphors which are created in this manner have no individual coloring and glow up very brightly. The effective concentration of the manganese combination occurs with an addition of 0.5 to 40 mol per cent.

In the following paragraph we give a few examples showing the change of the luminescence resulting from the addition of manganese:

Lead phosphate produces in calcium phosphate a weak bluish luminescence; by an addition of manganese phosphate a very good red luminescence is obtained. Tin phosphate gives aluminum phosphate a very good luminescence of yellowish green color; by the addition of manganese phosphate, this luminescence changes over, without changing intensity, into a red-orange. Tin phosphate gives a potassium and strontium phosphate a good luminescence of yellowish blue coloring, but after a manganese phosphate is added, a red glow is obtained, without change in the intensity.

The borate and phosphate materials or phosphors produced in the manner described hereinabove may be excited to luminescence by ultraviolet light or X-rays, or by electron rays. They can be applied for many purposes.

The following table gives a number of examples:

I—very good, II—good, III—medium, y—yellow, ygr—yellowish green, bl—blue, grbl—greenish blue, why—white-yellow, vibl—violet blue, or—orange, whbl—whitish blue.

| | Borate | | | | Phosphate | | | |
|---|---|---|---|---|---|---|---|---|
| | Silver | Thallium | Tin | Lead | Silver | Thallium | Tin | Lead |
| Li | | III bl | III grbl | | | III vibl | III grbl | |
| Na | | III bl | III grbl | | | III vibl | III II | |
| K | | III bl | III grbl | - | | III vibl | III ygr II | |
| Be | | III bl | | | II why | III vibl | III y II grbl | |
| Mg | | III bl | | | II whbl | III vibl | | |
| Ca | III whbl | II bl | III bl | III bl | II why | III vibl | III bl | |
| Sr | III wh | III bl | | | III whbl | III vibl | II bl | |
| Ba | | III bl | | | III whbl | III vibl | II bl | |
| Zn | I why | III bl | II grbl | | III whbl | III vibl | II grbl | III bl |
| Cd | I y | III bl | | III y | III whbl | III vibl | III ygr I | |
| Al | III bl+y | III bl | III grbl | | II bl+y | III vibl | III ygr I | |
| La | | | III bl | | III bl | III vibl | III bl | |

What we claim as new and desire to secure by Letters Patent of the United States is:

1. A luminous substance comprising a heat treated combination of one or more of the materials belonging to the group of compounds consisting of the borates and phosphates of the alkali metals, the metals of the second group of the periodic system excepting mercury, and the metals of the third group of the periodic system, activated by 0.05 to 30 mol per cent of one or more activating materials belonging to the group of compounds consisting of the borates and phosphates of silver, thallium, tin and lead.

2. A luminous substance comprising a heat treated combination of one or more of the materials belonging to the group of compounds consisting of the borates and phosphates of the alkali metals, the metals of the second group of the periodic system excepting mercury, and the metals of the third group of the periodic system, activated by 0.05 to 30 mol per cent of one or more activating materials belonging to the group of compounds consisting of the borates and phosphates of silver, thallium, tin and lead, and 0.5 to 40 mol per cent of an activating material belonging to the group of compounds consisting of the borate and phosphate of manganese.

3. A luminous substance comprising a heat treated combination of one or more of the materials belonging to the group of compounds consisting of the borates and phosphates of the alkali metals, the metals of the second group of the periodic system excepting mercury, and the metals of the third group of the periodic system, activated by 0.05 to 30 mol per cent of one or more activating materials belonging to the group of compounds consisting of the borates and phosphates of silver, thallium, tin and lead, said materials being fused and solidified into a glassy mass.

MAGDALENE HÜNIGER.
HANS PANKE.